United States Patent
Vivanco

(10) Patent No.: US 9,307,441 B1
(45) Date of Patent: Apr. 5, 2016

(54) SYSTEMS AND METHODS OF TRANSFERRING INFORMATION TO A WIRELESS DEVICE

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 133 days.

(21) Appl. No.: 13/901,969

(22) Filed: May 24, 2013

(51) Int. Cl.
*H04W 28/02* (2009.01)

(52) U.S. Cl.
CPC ................................. *H04W 28/0231* (2013.01)

(58) Field of Classification Search
None
See application file for complete search history.

(56) References Cited

U.S. PATENT DOCUMENTS

| | | | | |
|---|---|---|---|---|
| 5,027,356 A | * | 6/1991 | Nakamura et al. | 714/748 |
| 5,319,638 A | * | 6/1994 | Lin | 370/235 |
| 5,487,072 A | * | 1/1996 | Kant | 714/748 |
| 5,928,330 A | * | 7/1999 | Goetz et al. | 709/231 |
| 7,796,999 B1 | | 9/2010 | Martin et al. | |
| 8,819,259 B2 | * | 8/2014 | Zuckerman et al. | 709/231 |
| 2006/0112168 A1 | * | 5/2006 | Albers et al. | 709/213 |
| 2011/0007638 A1 | | 1/2011 | Xu et al. | |

* cited by examiner

*Primary Examiner* — Hassan Kizou
*Assistant Examiner* — Roberta A Shand

(57) ABSTRACT

In systems and methods of transferring information to a wireless device, a first portion of information is received and stored in a memory of the wireless device, and the first portion is presented while a second portion of the information is received. A presentation rate at which the first portion is presented is determined, and a time until the first portion is completely presented is determined based on the presentation rate and a size of the first portion. A number of times that a packet retransmission criteria is met is determined, and a maximum permitted number of packet retransmissions is adjusted based on the time until the first portion is completely presented and the number of times that the packet retransmission criteria is met.

21 Claims, 5 Drawing Sheets

SYSTEMS AND METHODS OF TRANSFERRING INFORMATION TO A WIRELESS DEVICE

TECHNICAL BACKGROUND

A wireless device in communication with a communication network can receive media content over a wireless communication link and present the media content to a user. While the information comprising the media content can be downloaded to the wireless device before presentation, the devices and networks are also capable of beginning presentation of the information before the entirety of the information is transferred to the wireless device, sometimes called streaming or a progressive download. A wireless device capable of presenting information which is progressively downloaded typically uses local storage, such as a buffer or other memory capability, to store a portion of the information as it is received and to present the stored portion of the information from the local storage. Presentation of the stored information may stop, stutter, or be otherwise degraded when a presentation rate exceeds a rate at which the information is transferred to the wireless device and stored in the local storage. The amount of information stored in the local storage can vary depending on, among other things, available bandwidth, data throughput to the wireless device, the presentation rate of the information, as well as transport mechanisms which can be specified in a transport protocol used to transfer the information.

Overview

In an embodiment, a first portion of information is received and stored in a memory of a wireless device, the first portion of the information is presented while a second portion of the information is received, and a presentation rate of the first portion of the information is determined. A time until the first portion is completely presented based on the presentation rate and a size of the first portion, and a number of times that a packet retransmission criteria is met, are also determined. The packet retransmission criteria comprises a maximum permitted number of packet retransmissions. The maximum permitted number of packet retransmissions is adjusted based on the time until the first portion is completely presented and the number of times that the packet retransmission criteria is met.

DETAILED DESCRIPTION

Figure 1:
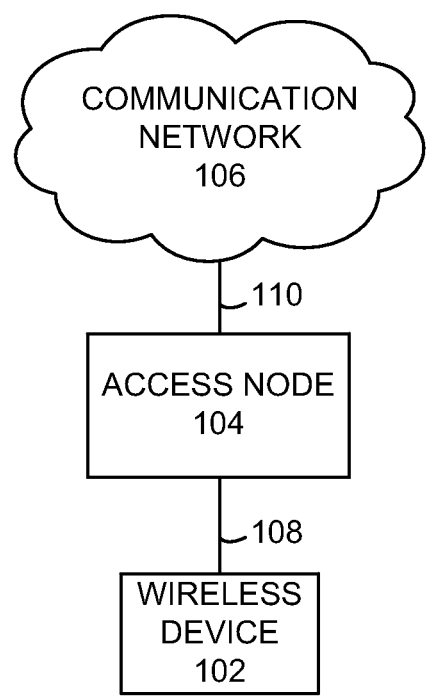
FIG. 1 illustrates an exemplary communication system to transfer information to a wireless device.

FIG. 1 illustrates an exemplary communication system 100 to transfer information to a wireless device comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

One way to increase data transmission reliability in wireless communications is through repetition. Wireless communication systems can employ a feedback mechanism whereby a receiving wireless device can request the retransmission of information which is not received, which is received but cannot be properly decoded, and so forth. Examples of such feedback mechanisms include Automatic Repeat reQuest (ARQ) and Hybrid ARQ (HARQ) mechanisms. In ARQ, a sender over a wireless link (such as an access node) can be requested by a receiver (such as a wireless device) to retransmit a packet when a previous transmission attempt was unsuccessful. HARQ systems also include the use of additional forward error correction (FEC) information, which increases transmission accuracy at the cost of transmission efficiency (due to among other things the increased overhead on the wireless communication link). In general, such feedback mechanisms enable a receiving wireless device to notify a sender when information is lost or corrupted in transmission, and when notified, the sender can retransmit the lost or corrupt information.

In addition, data networks can employ a mechanism do detect and mitigate network congestion. One such commonly used mechanism is provided within the Transfer Control Protocol (TCP), in which data loss can be interpreted as resulting from network congestion. Within TCP, a request for data retransmission sent to a TCP sender (for example, a content provider) can cause the TCP sender to decrease its rate of transmission (for example, by decreased a TCP congestion window, or a similar mechanism). In a situation where a wireless device is progressively downloading information and presenting the downloaded information, a reduction in the rate of transmission from the TCP sender can reduce the rate at which the wireless device receives and stores information below a rate of presentation of the information, which may require the wireless device to stop presentation of the information, or may cause the presentation of the information to stutter or otherwise be degraded.

In operation, a first portion of information is received and stored in a memory of wireless device 102, and the first portion of the information is presented while a second portion of the information is received. The first portion can comprise one or more units of the information for transmission, such as packets or a similar structure used to transmit the information. A presentation rate of the first portion of the information is determined, and based on the presentation rate and a size of the first portion a time until the first portion is completely presented can be determined. The presentation rate of the first portion provides, for example, an indication of how rapidly the first portion stored at wireless device 102 is being read out of memory for presentation. Further, a number of times that a packet retransmission criteria is met is also determined. The packet retransmission criteria can comprise a maximum permitted number of packet retransmissions. The number of packet retransmissions can provide an indication of whether sufficient information is being received and stored at wireless device 102 to support the presentation of the information at wireless device 102. Based on the time until the first portion is completely presented and the number of times that the packet retransmission criteria is met, the maximum permitted number of packet retransmissions can be adjusted.

Figure 2:
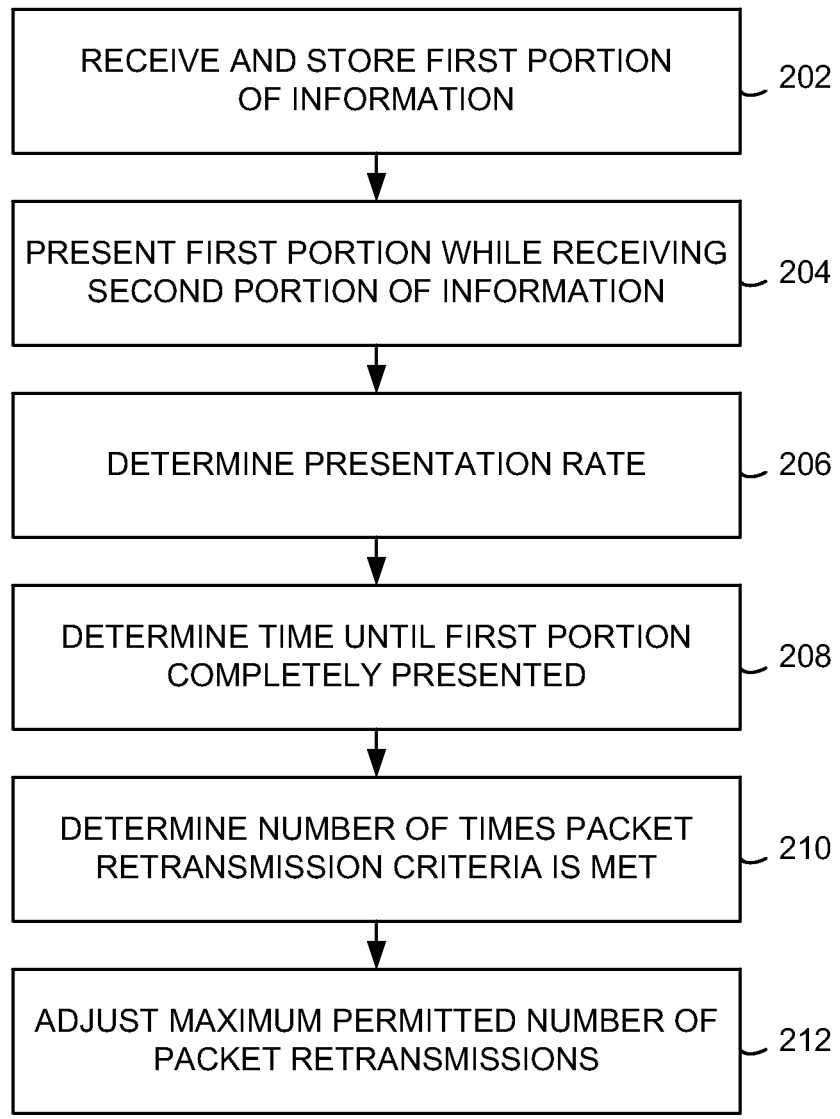
FIG. 2 illustrates an exemplary method of transferring information to a wireless device.

FIG. 2 illustrates an exemplary method of transferring information to a wireless device. In operation 202, a first portion of the information is received and stored in a memory of the wireless device. For example, wireless device 102 can receive and store a first portion of the information sent from access node 104. The information can comprise video data, audio data, multimedia data, a digital media file, and the like, including combinations thereof, which can be transmitted in one or more portions over communication link 108. In an embodiment, the first portion and the second portion can be transmitted in one or more data packets or other transmission formats, to enable the transmission of the information.

The stored first portion is presented while receiving a second portion of the information (operation 204). For example, the first portion of a multimedia file comprising video and audio information can be received and stored at wireless device 102, and further the first portion can be presented to a user, for example, by a presentation application such as a media player or other similar application, while a second portion of the multimedia file is received at wireless device 102. In an embodiment, the first portion of the information can be stored in a memory of wireless device 102, such as a buffer or other memory from which the stored first portion can be presented. Presentation of the first portion can comprise, for example, playing audio data (such as music, speech information, and the like), displaying multimedia data (such as a movie, a television show, or other audiovisual information), and so forth.

In operation 206, a presentation rate at which the first portion is presented is determined. The presentation rate can comprise a rate at which the stored first portion is retrieved from the memory of wireless device 102 and presented to the user. Based on the presentation rate and a size of the first portion, a time until the first portion is completely presented can be determined (operation 208). For example, based on conditions of communication link 108, available bandwidth, available communication link resources, a maximum achievable data rate, and the like, the first portion can be received and stored in the memory of wireless device 102. In an embodiment, presentation of the first portion may not begin until a threshold amount of information (such as a threshold amount of the first portion) is received and stored in the memory of wireless device 102. When presentation of the first portion has begun, a presentation rate of the first portion can be determined. Further, based on the size or amount of the first portion stored in memory and the presentation rate, a time until the first portion is completely presented can be determined. The first portion can be completely presented when, for example, no information remains in memory, or when an amount of the first portion stored in memory meets a data threshold, or when a remaining amount of the first portion does not support presentation to the user, and the like, including combinations thereof.

In an embodiment, the first portion may be added to during presentation of the first portion, for example, as the second portion is received during presentation. For example, the first portion can comprise information stored at wireless device 102, and the second portion can comprise information being received by wireless device 102 from access node 104. Based on the presentation rate, the rate at which the second portion is received, and the amount of information stored at wireless device 102, the time until the first portion is completely presented can be determined.

In operation 210, a number of times that a packet retransmission criteria is met is determined, wherein the packet retransmission criteria comprises a maximum permitted number of packet retransmissions. In general, feedback mechanisms (such as ARQ or HARQ) enable a receiving wireless device to notify a sender when information is lost or corrupted in transmission. For example, wireless device 102 can notify access node 104 that information is lost (such as a lost packet or other unit of transmitted data), and when notified, access node 104 can retransmit the lost or corrupt information. In general, ARQ/HARQ serves to attempt to correct packet loss or error over a wireless communication link by retransmitting a lost or corrupted packet multiple times. If the ARQ or HARQ mechanism fails to remedy the packet loss or error, the receiver (e.g., wireless device 102) can determine that the packet is lost and can notify the sender (such the data source, or data provider) of the packet loss. When the data source or provider is notified of information loss or corruption, the source can retransmit the lost data. In addition, the data provider can also reduce the rate of transmission of the information.

This may result from mechanisms of a transfer protocol used to transmit the information. For example, communication system 100 may employ Transfer Control Protocol (TCP) to convey the information to wireless device 102. TCP is a transport protocol widely used in the transmission of data across networks and internetworks, and is used by numerous application types. Typically, TCP includes congestion control and avoidance methods that determine an appropriate congestion window for a network node or element by increasing the traffic through the network node until packet loss is detected. The use of an additive increase/multiplicative decrease feedback control algorithm in TCP can cause a reduction in the rate of packet transmission from a network node when congestion is detected. Typically, TCP enables endpoints to detect and address network node congestion, and to mitigate detected congestion by dropping and retransmitting packets, and also by decreasing the TCP congestion window to decrease the sender's transmission rate.

In a situation where a wireless device is progressively downloading information and presenting the downloaded information, a reduction in the rate of transmission can starve the wireless device for information, which may require the wireless device to stop presentation of the information, or may cause the presentation of the information to stutter or otherwise be degraded. Thus, the sender may not decrease the transmission of information upon the receipt of the first retransmission request. In operation, a number of retransmission requests of a particular portion of information (for example, a particular data packet) may be required before the transmission rate is decreased. For example, access node 104 can be configured with a maximum number of retransmission requests, such that the retransmission of a portion of information may be requested a plurality of times, and when the number of retransmission requests meets the maximum number, then the sender decreases the rate of information transmission. The number of times which this maximum number of retransmission requests is reached can also be determined. In operation 210, a number of times that a packet retransmission criteria is met is determined, wherein the packet retransmission criteria comprises a maximum permitted number of packet retransmissions.

In operation 212, the maximum permitted number of packet retransmissions is adjusted based on the time until the first portion is completely presented and the number of times that the packet retransmission criteria is met. For example, the maximum permitted number of packet retransmissions for access node 104 can be adjusted so that presentation of the information at wireless device 102 is not impaired or degraded. Adjusting the maximum permitted number of packet retransmissions can postpone or prevent access node 104 from reducing the rate of transmission of the information where such reduction may cause degradation of the presentation of the information at wireless device 102.

Figure 3:
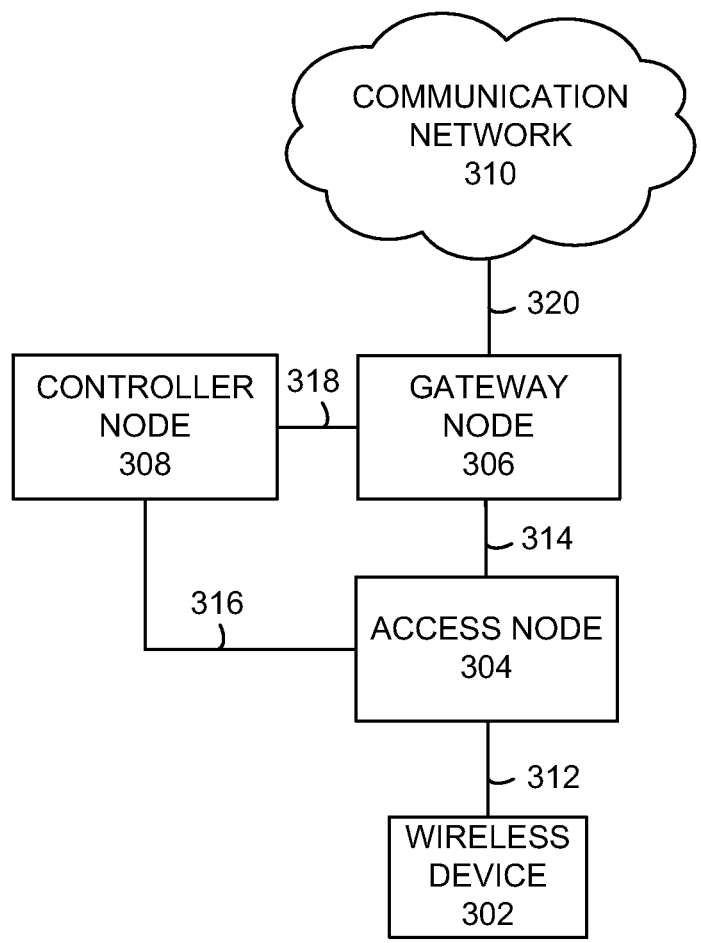
FIG. 3 illustrates another exemplary communication system to transfer information to a wireless device.

FIG. 3 illustrates another exemplary communication system 300 to transfer information to a wireless device comprising wireless device 302, access node 304, gateway node 306, controller node 308, and communication network 310. Examples of wireless device 302 can include a cell phone, a smart phone, a computing platform such as a laptop, palmtop, or tablet, a personal digital assistant, or an internet access device, including combinations thereof. Wireless device 302 is in communication with access node 304 over communication link 312.

Access node 304 is a network node capable of providing wireless communications to wireless device 302, and can be, for example, a base transceiver station, a radio base station, an eNodeB device, or an enhanced eNodeB device. Access node 304 is in communication with gateway node 306 over communication link 314, and with controller node 308 over communication link 316.

Gateway node 306 can comprise a processor and associated circuitry to execute or direct the execution of computer-readable instructions, and can be configured to maintain network connection information associated with wireless device 302. Gateway node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 306 can receive instructions and other input at a user interface. Examples of gateway node 306 can include a standalone computing device, a computer system, or a network component, such as an access service network gateway (ASN-GW), a packet data network gateway (P-GW), a serving gateway (S-GW), a packet data serving node (PDSN), call processing equipment, a home agent, a radio node controller (RNC), a subscriber profile system (SPS), authentication, authorization, and accounting (AAA) equipment, and network gateways, including combinations thereof. Gateway node 306 is in communication with controller node 308 over communication link 318 and with communication network 312 over communication link 320.

Controller node 308 can comprise can comprise a processor and associated circuitry to execute or direct the execution of computer-readable instructions, and can be configured to maintain network connection information associated with wireless device 302. Controller node 308 can control the setup and maintenance of a communication session over communication network 310 by wireless device 302. Controller node 308 can comprise a mobility management entity (MME), a mobile switching center (MSC), a dispatch call controller (DCC), or another similar network node. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can receive instructions and other input at a user interface.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 312, 314, 316, 318 and 320 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 304, gateway node 306, controller node 308 and communication network 310 which are omitted for clarity, including additional processing nodes, routers, gateways, and physical and/or wireless data links for carrying data among the various network elements.

Figure 4:
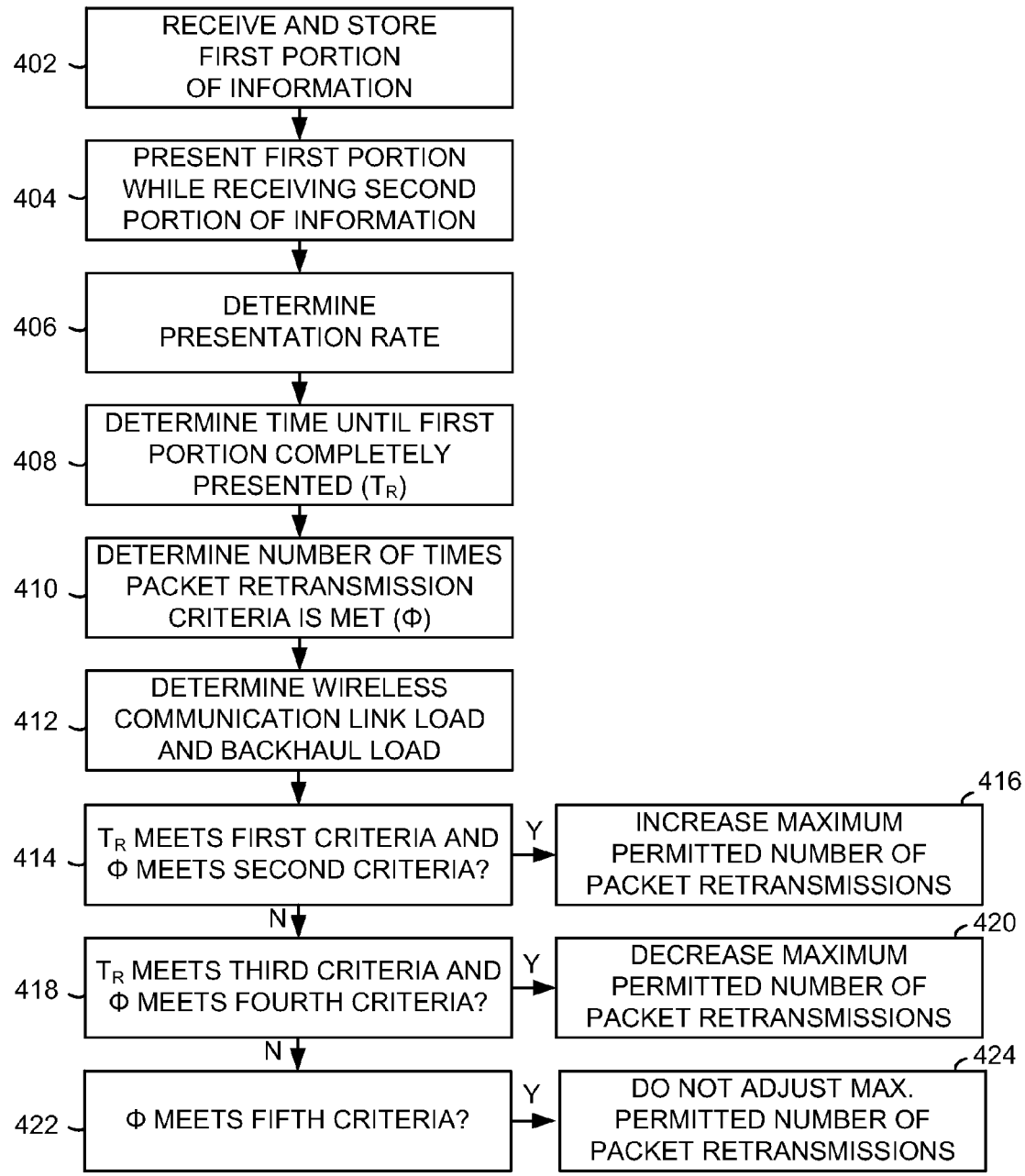
FIG. 4 illustrates another exemplary method of transferring information to a wireless device.

FIG. 4 illustrates another exemplary method of transferring information to a wireless device. A first portion of the information is received and stored in a memory of the wireless device (operation 402). For example, wireless device 302 can receive and store a first portion of information sent from access node 304. The information can comprise video data, audio data, multimedia data, a digital media file, and the like, including combinations thereof, which can be transmitted in one or more portions over communication link 312. In an embodiment, the first portion and the second portion can be transmitted in one or more data packets or other transmission formats, to enable the transmission of the information.

In operation 404, the stored first portion is presented while receiving a second portion of information. For example, the first portion of a multimedia file comprising video and audio information can be received and stored at wireless device 302 in a local storage such as a buffer or another memory device. Further, the first portion can be presented to a user, for example, by a presentation application such as a media player or other similar application, while a second portion of the multimedia file is received at wireless device 302. In an embodiment, the first portion of the information can be stored in a memory of wireless device 302, such as a buffer or other memory from which the stored first portion can be presented.

A presentation rate at which the first portion is presented is determined (operation 406). The presentation rate can comprise a rate at which the stored first portion is retrieved from the memory of wireless device 302 and presented. Based on the presentation rate and a size of the first portion (e.g., a size of the first portion stored in the memory of wireless device 302), a time until the first portion is completely presented can be determined (operation 408). For example, based on conditions of communication link 108, available bandwidth, available communication link resources, a maximum achievable data rate, and the like, the first portion can be received and stored in the memory of wireless device 302. The time until the first portion is completely presented can be expressed as time remaining ($T_R$).

In an embodiment, presentation of the first portion may not begin until a threshold amount of information (such as a threshold amount of the first portion) is received and stored in the memory of wireless device 302. When presentation of the first portion has begun, the presentation rate of the first portion can be determined. Further, based on the size or amount of the first portion stored in memory and the presentation rate, the time remaining ($T_R$) can be determined. The first portion can be completely presented when, for example, no information remains in memory, when an amount of the first portion stored in memory meets a data threshold, when a remaining amount of the first portion does not support presentation to the user, when the presentation of the information begins to degrade (for example, when a video, audio, or multimedia information begins to stutter, etc.) and the like, including combinations thereof.

In an embodiment, the first portion may be added to during presentation of the first portion, for example, as the second portion is received during presentation. For example, the first portion can comprise an amount of the information stored at wireless device 302, and the second portion can comprise an amount of the information being received by wireless device 302 from access node 304. Based on the presentation rate, the rate at which the second portion is received, and the amount of information stored at wireless device 302, the time until the first portion is completely presented can be determined.

In operation 410, a number of times that a packet retransmission criteria is met is determined, wherein the packet retransmission criteria comprises a maximum permitted number of packet retransmissions. The number of times that the packet retransmission criteria is met can be represented as $\Phi$. In general, a feedback mechanism (such as ARQ or HARQ) can enable a receiving wireless device to notify a sender when information is lost or corrupted in transmission. For example, wireless device 302 can notify access node 304 that information is lost (such as a lost packet or other unit of transmitted data), and when notified, access node 304 can retransmit the lost or corrupt information.

In a situation where a wireless device is progressively downloading information and presenting the downloaded information, a reduction in the rate of transmission can cause the amount of information stored on the wireless device to drop below a required level, such as an amount of information required to support its presentation. This may require the wireless device to stop presentation of the information, or it may cause the presentation of the information to stutter or otherwise be degraded. Thus, the sender may not be instructed to decrease the transmission of information upon the receipt of the first retransmission request. In operation, a number of retransmission requests of a particular portion of information (for example, a particular data packet) may be required before the transmission rate is decreased. For example, access node 304 can be configured with a maximum number of retransmission requests, such that the retransmission of a portion of information may be requested a plurality of times, and when the number of retransmission requests meets the maximum number, then the sender decreases the rate of information transmission. The number of times which this maximum number of retransmission requests is reached ($\Phi$) can also be determined (operation 410).

In addition, a wireless communication link load and a backhaul load can be determined (operation 412). An amount of demand for network resources or resource congestion can impair delivery of the information to wireless device 302. Network congestion can arise on communication link 312 between access node 304 and wireless device 302, or on a backhaul between communication network 310 and wireless device 302 (for example, some combination of communication links 314, 316 and 320), or on both the backhaul and communication link 312. A wireless communication link load of communication link 312 and a backhaul load can be determined, including combinations thereof. The wireless communication link load and/or the backhaul load can be used in to determine whether to adjust a maximum permitted number of packet retransmissions, as further described below.

A maximum permitted number of packet retransmissions can be adjusted based on the time until the first portion is completely presented and the number of times that the packet retransmission criteria is met. For example, it can be determined whether $T_R$ meets a first criteria and $\Phi$ meets a second criteria (operation 414). In an embodiment, the first criteria can comprise a first time threshold, and the second criteria can comprise a first number of times that the packet retransmission criteria is met. In an embodiment, $T_R$ can meet the first criteria when $T_R$ is less than or equal to the first criteria, and $\Phi$ can meet the second criteria when $\Phi$ is greater than or equal to the second criteria. For example, when the time until the first portion is completely presented is relatively small, and the number of times that the packet retransmission criteria is met is relatively large (operation 414-Y), the maximum permitted number of packet retransmissions is increased (operation 416). Increasing the maximum permitted number of packet retransmissions increases the threshold at which the rate of information transmission by access node 304 will be decreased, permitting more packet retransmissions to be requested (e.g., by wireless device 302) before the rate of information transmission by access node is decreased.

When $T_R$ does not meet the first criteria and $\Phi$ does not meet the second criteria (operation 414-N), it can be determined whether $T_R$ meets a third criteria and $\Phi$ whether meets a fourth criteria (operation 418). In an embodiment, $T_R$ can meet the third criteria when $T_R$ is greater than the first criteria. It will further be appreciated that, in an embodiment, $T_R$ can meet the first criteria when $T_R$ is less than the first time threshold, and $T_R$ can meet the third criteria when $T_R$ is greater than or equal to the first time threshold. $\Phi$ can meet the fourth criteria when $\Phi$ is less than the first number of times that the packet retransmission criteria is met.

In an embodiment, the number of times that the maximum permitted number of packet retransmissions is met ($\Phi$) can be divided into ranges. For example, $\Phi$ can be divided into three ranges by two thresholds, a higher threshold and a lower threshold. In an embodiment, $\Phi$ can meet the second criteria when $\Phi$ is greater than or equal to the higher threshold, and $\Phi$ can meet the fourth criteria when $\Phi$ is less than the higher threshold and greater the lower threshold. In an embodiment, when the time until the first portion is completely presented is relatively large, and the number of timer that the packet retransmission criteria is met is relatively moderate (operation 414-Y), the maximum permitted number of packet retransmissions is decreased (operation 416). Decreasing the maximum permitted number of packet retransmissions decreases the threshold at which the rate of information transmission by access node 304 will be decreased, to use network resources more efficiently.

In an embodiment, $\Phi$ can meet a fifth criteria when $\Phi$ is less than the lower threshold. (With respect to the thresholds described above, whether the ranges are considered to be inclusive or exclusive of the thresholds is not limiting, and it will be appreciated that either of a range above or below a threshold can include the threshold—through typically not both—without limiting the above.) When $\Phi$ meets the fifth criteria (operation 422-Y), the maximum permitted number of packet retransmissions is not adjusted (operation 424). For example, where the number of times that the maximum permitted number of packet retransmissions is met is relatively small, then no adjustment to the maximum permitted number of packet retransmissions is required.

In an embodiment, the wireless communication link load can also be considered when determining whether to adjust the maximum permitted number of packet retransmissions. For example, when the wireless communication link load meets a load threshold, the maximum permitted number of packet retransmissions can be adjusted based on the time until the first portion is completely presented, the number of times that packet retransmission criteria has been met, as well as the wireless communication link load. In an embodiment, it may be required that the wireless communication link load meets the load threshold. In an embodiment, whether the wireless communication link load meets the load threshold may be considered as one factor, together with the time until the first portion is completely presented, as well as the number of times that packet retransmission criteria has been met, in determining whether to adjust the maximum permitted number of packet retransmissions.

Among other things, the wireless communication link load can affect a packet retransmit time. The time required for information to be retransmitted can be increased as the wireless communication link load increases. In an embodiment, an upper limit for the maximum permitted number of packet retransmissions can be determined based on the packet retransmit time. The packet retransmit time can further be determined based on whether a packet is lost in transmission to the wireless device. The packet retransmit time can further be determined based on a number of times which the wireless device sends a message to indicate that a packet of the first portion has been lost. In an embodiment, the packet retransmit time can be used in addition to, or as an alternative to, the wireless communication link load when determining whether to adjust the maximum permitted number of packet retransmissions. This would enable the determination of a maximum permitted number of packet retransmissions which avoids a TCP timeout, which can result in the termination of the communication session with the wireless device.

In addition, or alternatively, the backhaul load can also be considered when determining whether to adjust the maximum permitted number of packet retransmissions. For example, when the backhaul load meets a backhaul load threshold, the maximum permitted number of packet retransmissions can be adjusted based on the time until the first portion is completely presented, the number of times that packet retransmission criteria has been met, as well as the backhaul load. In embodiments, it may be required that the backhaul load meets the backhaul load threshold, or whether the backhaul load meets the backhaul load threshold may be considered as one factor in the determination of whether to adjust the maximum permitted number of packet retransmissions.

Figure 5:
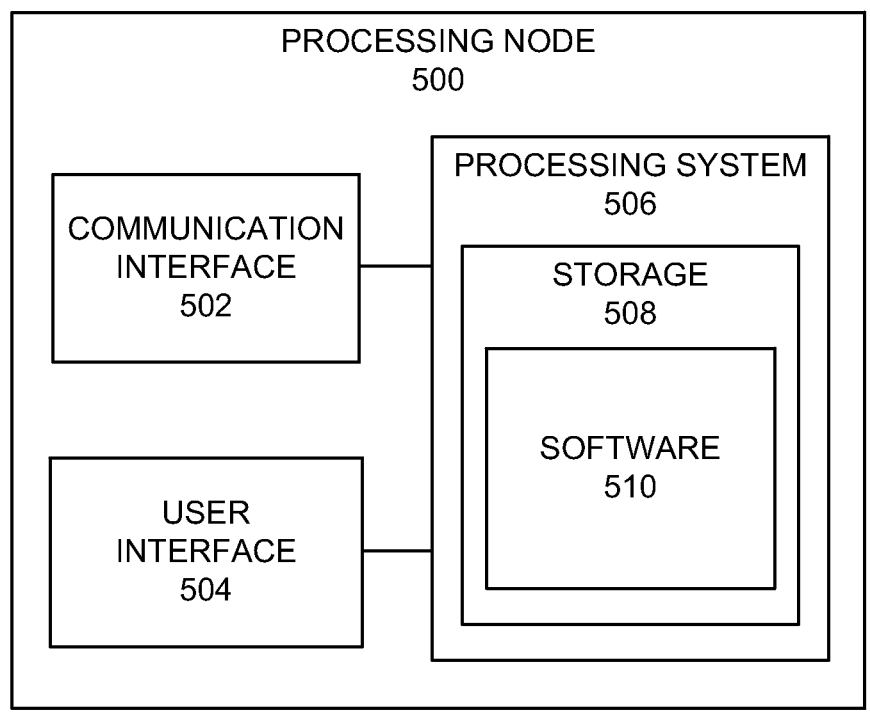
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to transfer information to a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104, access node 304, gateway node 306, and controller node 308. Processing node 500 can also be an adjunct or component of a network element, or processing node 500 can also be another network element in a communication system. The functionality of processing node 500 can also be distributed among one or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of transferring a plurality of data packets to a wireless device, comprising:
   receiving and storing a first portion of the plurality of data packets in a memory of the wireless device;
   presenting the stored first portion while receiving a second portion of the plurality of data packets;
   determining a presentation rate at which the first portion is presented;
   determining a time until the first portion is completely presented based on the presentation rate and a size of the first portion;
   determining a number of times that a packet retransmission criteria is met,
   wherein the packet retransmission criteria comprises a maximum permitted number of packet retransmissions of the plurality of data packets; and
   adjusting the maximum permitted number of packet retransmissions based on the time until the first portion is completely presented and the number of times that the packet retransmission criteria is met.

2. The method of claim 1, wherein adjusting the maximum permitted number of packet retransmissions further comprises:
   increasing the maximum permitted number of packet retransmissions when the time until the first portion is completely presented meets a first criteria and the number of times that the packet retransmission criteria is met meets a second criteria.

3. The method of claim 2, wherein adjusting the maximum permitted number of packet retransmissions further comprises:
   decreasing the maximum permitted number of packet retransmissions when the time until the first portion is completely presented meets a third criteria and the number of times that the packet retransmission criteria is met meets a fourth criteria.

4. The method of claim 3, wherein the first criteria comprises a first time until the first portion is completely presented, and wherein the third criteria comprises a second time until the first portion is completely presented which is larger than the first criteria.

5. The method of claim 3, wherein the third criteria comprises a first number of times that that the packet retransmission criteria is met, and wherein the fourth criteria comprises a second number of times that the packet retransmission criteria is met which is smaller than the third criteria.

6. The method of claim 3, wherein adjusting further comprising:
   making no change in the maximum permitted number of packet retransmissions when the number of times that the packet retransmission criteria is met meets a fifth criteria which is smaller than the fourth criteria.

7. The method of claim 1, further comprising:
   determining a packet retransmit time; and
   determining an upper limit for the maximum permitted number of packet retransmissions based on the packet retransmit time.

8. The method of claim 1, wherein determining a number of times that packet retransmission criteria is met further comprises determining that a packet of the first portion has been lost.

9. The method of claim 8, further comprising determining a number of times which the wireless device sends a message to indicate that a packet of the first portion has been lost.

10. The method of claim 1, further comprising:
    determining a wireless communication link load of a communication link over which the first portion and the second portion are received by the wireless device; and
    adjusting the maximum permitted number of packet retransmissions based on the time until the first portion is completely presented, the number of times that packet retransmission criteria has been met, and the wireless communication link load.

11. The method of claim 10, wherein adjusting the maximum permitted number of packet retransmissions further comprises:
- determining the wireless communication link load of the communication link over which the first portion and the second portion are received by the wireless device; and
- increasing the maximum permitted number of packet retransmissions when the time until the first portion is completely presented meets a first criteria, the number of times that packet retransmission criteria is met meets a second criteria, and the wireless communication link load.

12. The method of claim 1, further comprising:
- determining a backhaul load of a communication link over which the first portion and the second portion are transported; and
- adjusting the maximum permitted number of packet retransmissions based on the time until the first portion is completely presented, the number of times that packet retransmission criteria has been met, and the backhaul load.

13. A system for transferring a plurality of data packets to a wireless device, comprising:
- a processing node configured to determine a presentation rate at which a first portion of the plurality of data packets stored on a wireless device is presented while a second portion of the plurality of data packets is received;
- determine a time until the first portion is completely presented based on the presentation rate and a size of the first portion;
- determine a number of times that a packet retransmission criteria is met, wherein the packet retransmission criteria comprises a maximum permitted number of packet retransmissions of the plurality of data packets; and
- adjust the maximum permitted number of packet retransmissions based on the time until the first portion is completely presented and the number of times that the packet retransmission criteria is met.

14. The system of claim 13, wherein the processing node is further configured to increase the maximum permitted number of packet retransmissions when the time until the first portion is completely presented meets a first criteria and the number of times that the packet retransmission criteria is met meets a second criteria.

15. The system of claim 14, wherein the processing node is further configured to decrease the maximum permitted number of packet retransmissions when the time until the first portion is completely presented meets a third criteria and the number of times that the packet retransmission criteria is met meets a fourth criteria.

16. The system of claim 15, wherein the third criteria comprises a first number of times that that the packet retransmission criteria is met, and wherein the fourth criteria comprises a second number of times that the packet retransmission criteria is met which is smaller than the third criteria.

17. The system of claim 15, wherein the processing node is further configured to make no change in the maximum permitted number of packet retransmissions when the number of times that the packet retransmission criteria is met meets a fifth criteria which is smaller than the fourth criteria.

18. The system of claim 13, wherein the processing node is further configured to determine a packet retransmit time; and
- determine an upper limit for the maximum permitted number of packet retransmissions based on the packet retransmit time.

19. The system of claim 13, wherein the processing node is further configured to determine that a packet of the first portion has been lost.

20. The system of claim 19, wherein the processing node is further configured to determine a number of times which the wireless device sends a message to indicate that a packet of the first portion has been lost.

21. The system of claim 15, wherein the third criteria comprises a first number of times that the packet retransmission criteria is met, and wherein the fourth criteria comprises a second number of times that the packet retransmission criteria is met which is smaller than the third criteria.

* * * * *